April 14, 1964   F. J. LUKETA   3,128,992
ADJUSTABLE AND LOCKABLE OFFSET PULLEY
Filed Oct. 31, 1960
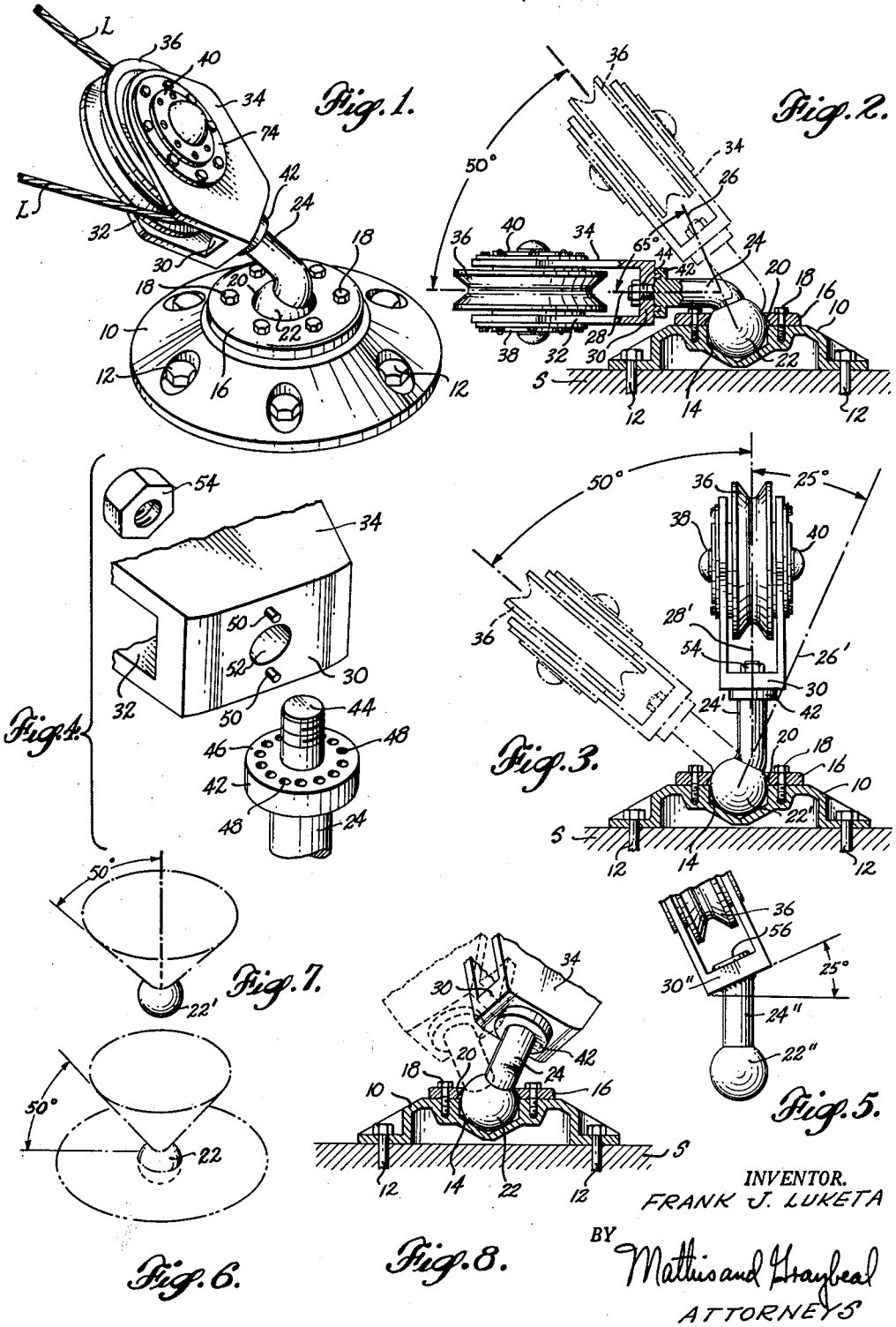
INVENTOR.
FRANK J. LUKETA
BY Mathis and Graybeal
ATTORNEYS

United States Patent Office 3,128,992
Patented Apr. 14, 1964

3,128,992
ADJUSTABLE AND LOCKABLE OFFSET PULLEY
Frank J. Luketa, 5567 Greenwood Ave., Seattle, Wash.
Filed Oct. 31, 1960, Ser. No. 66,078
7 Claims. (Cl. 254—195)

The present invention relates to pulley assemblies and more particularly relates to pulley assemblies expressly designed for use in line rigging arrangements wherein a pulley needs to be set at a particular desired angle to accommodate lines led thereto in any of a wide variety of orientation possibilities. By way of typical and therefore non-limitive example, pulley assemblies characteristic of the present invention have a special utility respecting commercial fishing gear hauling arrangements, wherein the gear handling lines are led through pulley arrays to multiple drum winching mechanism, the pulley arrays being arranged as needed on a sloping supporting surface such as a crowned boat deck, in a manner such as disclosed in my copending application Serial No. 861,325, filed December 22, 1959, entitled "Door Securing Stanchion for Trawlers" and in my copending application Serial No. 26,554, filed May 3, 1960, entitled "Cable Meter for Trawlers," of which applications this application is a continuation-in-part.

Heretofore, pulley assemblies to accommodate randomly arranged lines have involved pulley design custom-built for each type of placement, with a considerable inventory of types of pulley assemblies being necessary to cover all adjustment possibilities, or have involved relatively cumbersome and complicated pulley assembly construction in order to provide the necessary adjustment flexibility. Moreover, prior pulley assemblies of an angularly adjustable nature characteristically involve a single point of angular adjustment. Also, many prior pulley assemblies are not lockable in any particular desired orientation, and are thus prone to line fouling as the pulley "flops" each time the line through the pulley is slackened.

In essence, the pulley assembly characteristic of the present invention involves a simple, easily fabricated, pulley mount including adjustable and lockable ball and socket means and an angularly offset ball to pulley connection. By advantageous selection of such angle of offset to be in the range of from about 25° to about 65°, a wide zone of adjustment is available as to the azimuthal and elevational attitude of the pulley with respect to the surface on which the pulley assembly is mounted. For example, a stem angle of offset of about 25° provides a zone of adjustment defined by revolving a 50° angle with its apex on said ball member through an arc of revolution centered substantially vertically of said base surface. By way of further example, a stem angle of offset of about 65° makes available a zone of adjustment which is defined by revolving an angle of about 50° through a circle of revolution above the base surface, the lower extreme of such zone being substantially parallel to said base surface. As a result, with an inventory of but two types of stems for the pulley assemblies, zones of adjustment are achieved which span any azimuthal and elevational position throughout a hemisphere above the mounting surface. Further, a preferred and particularly advantageous form of the pulley assembly of the present invention involves an adjustable setting between the stem and cheek spanner of the assembly, at predetermined increment angles, say at about each 20° for example, the rotational adjustment thus provided along with the rotational adjustment available at the ball member enabling any desired rotational setting of said cheek spanner with respect to the stem.

Accordingly, as will become apparent from the following more particular description of certain embodiments of the invention, the above specified stem angles along with the ball member and along with the rotational feature as respects the cheek spanner and the outer end of the stem, permit any azimuthal, elevational and rotational setting of the pulley with respect to the supporting surface on which the pulley assembly is mounted.

These and other characteristic features, objects and advantages of the present invention will be apparent from the following description of certain typical embodiments thereof, taken together with the accompanying illustrations, wherein like numerals refer to like parts, and wherein:

FIG. 1 is an isometric view from an upper aspect of a pulley assembly embodying the present invention, wherein the angle of offset between the line of connection of the cheek spanner with the stem is about 65°, and wherein the cheek spanner is incrementally settable on the stem at any desired position, in increments of about 20°.

FIG. 2 is a view, partially in cross section and partially in vertical elevation, of the pulley assembly shown in FIG. 1, the extent of adjustability thereof with respect to a surface on which the assembly is mounted also being shown;

FIG. 3 is a view in vertical cross section and vertical elevation, similar to the view of FIG. 2, but showing the modified form of stem configuration, wherein the stem angle of offset is about 25°;

FIG. 4 is an exploded view on an enlarged scale showing further detail of the mechanism for incrementally setting the rotational position of the cheek spanner with respect to the stem in the forms of the invention illustrated in FIGS. 1–3.

FIG. 5 is a fragmentary view of a further modified form of the invention, wherein the angle of offset between the line of connection of the stem with respect to the ball member and the line of connection of the cheek spanner to the stem is about 25°, and the cheek spanner is non-adjustably attached to the stem, as by welding;

FIG. 6 is a diagrammatic view illustrating the zone of azimuthal and elevational adjustment characteristic of the form of the invention illustrated in FIGS. 1 and 2;

FIG. 7 is a further diagrammatic view similar to FIG. 6, showing the zone of azimuthal and elevational adjustment characteristic of the form of the invention shown in FIG. 3; and FIG. 8 is a side elevational view, with certain parts broken away, of the form of the invention shown in FIG. 1, taken from an aspect rearwardly of the cheek spanner, showing a modified rotational setting of the cheek spanner with respect to the stem, and further illustrating the combined adjustment available with respect to the rotational position of the pulley with respect to the supporting surface for the assembly, as available from the stem and cheek spanner interadjustment and the ball member adjustment.

Turning to a more specific consideration of the form of the invention shown in FIGS. 1 and 2, base member 10 is suitably attached as by bolts, certain of which are indicated at 12, to supporting surface S, such as the crowned surface of a boat deck (noting FIG. 3 of my aforesaid application Serial No. 861,325, for example). Said base member 10 is provided centrally with a half-socket recess 14, and an annular locking ring 16 suitably adjustably attaches over half socket recess 14 in base member 10 by means such as bolts, certain of which are indicated at 18, the inner rim 20 of said ring 16 being a relatively large opening, or what may be termed a "wide-mouthed" opening, as compared with the area of the connection between a ball member 22 and a stem 24 standing out from said ball member 22. Said ring 16 provides a second half-socket receiving and lockably retaining ball member 22 in any azimuthal position with respect to said base member 10. An important consideration respecting the type of adjustment available at ball member 22 in the socket forming elements 14 and 20 is the substantial elevational adjustment also thus available, which is about 50° in the form shown at FIGS. 1 and 2.

Angularly offset stem 24 is junctured to ball member 22, as by welding or by being integrally cast therewith, and the angle of offset provided at the stem-ball juncture of the form of the invention shown at FIGS. 1 and 2 is about 65°, as measured from what may be termed the line or angle of connection 26 of the stem with the ball and what may be termed the line or angle of inclination of the pulley 36 as represented by line 28. As notable from the illustration thereof at FIG. 2, said line or angle of connection 26 between the stem 24 and ball member 22 at the stem-ball juncture extends substantially through the center of ball member 22 and the center of the area of juncture between said ball member 22 and stem 24. As will also be apparent, said line or angle of inclination 28 extends perpendicular to the axis of rotation of pulley wheel 36, and is axially coincident with the center of connection between spanner 30 and stem 24, with the angle of offset of said pulley wheel 28 and the ball member 24 being the angle of intersection between said line or angle of connection 26 and said line or angle of inclination 28. Line 28 also represents the center axis of cheek spanner 30 coincident with the center of juncture of said cheek spanner 30 and stem 24.

Cheek spanner 30 has parallel cheeks 32 and 34 extending outwardly therefrom, providing trunnions on which pulley wheel 36 is journaled for rotation in suitable bearing means contained between bearing caps 38 and 40, which detail of itself forms no part of the present invention. Preferably, however, the pulley wheel journaling is of a heavy duty type such as shown in my aforesaid application Serial No. 26,554, to which reference should be had for more explicit detail showing in this respect.

Line L is guided ground said pulley wheel 36 and, as indicated, it is the essential problem addressed by the present invention to provide in the pulley assembly mounting, adjusting and locking mechanism whereby said pulley wheel 36 can be oriented and locked to receive line L in whatever attitude is most desirable with respect to mounting surface S, as dictated by the associated equipments from which said line L is led.

To the end of also providing rotational adjustment of pulley wheel 36 with respect to stem 24, adjustment means are provided between said cheek spanner 30 and the outer end of stem 24 whereby the rotational position of said cheek spanner on said stem 24 is variable, one advantageous form of such adjustment being as shown in exploded form at FIG. 4. In this form, said stem end 24 is configurated near its end to provide a raised portion 42 and a threaded tip 44, said raised portion 42 at the surface 46 thereof abutting said cheek spanner 30 being provided with a series of holes, certain of which are indicated at 48, placed to receive a plurality of pins 50 standing out from the abutting surface of said cheek spanner 30. With said cheek spanner 30 assembled onto stem 24 by placement of threaded tip 44 through hole 52 in cheek spanner 30, said pins 50 nest in an opposite pair of the holes 48 and fix the relative position of cheek spanner 30 with respect to stem 24, the assembly being retained together by means of lock nut 54 applied to threaded tip 44 (also note FIG. 2). In the form of the assembly permitting rotational adjustment of the pulley on the stem, as shown at FIG. 4, a suitable number of holes 48 are provided in raised portion 42 to enable a setting of the major axis of cheek spanner 30 at about every 20° laterally of the line of direction 28 of stem 24. It is a characteristic of the assembly shown that such incremental rotational settings nevertheless permit any desired particular attitude of the major dimension of cheek spanner 30 with respect to mounting surface S in that there is also available a cheek spanner rotational adjustment at the mounting for ball member 22 which has a sufficient range or "throw" to span the angle between adjacent holes 48. To illustrate this feature, FIG. 8 provides a view similar to FIG. 2 but from an aspect providing a rear elevation of said cheek spanner 30. As shown in said FIG. 8, with ball member 22 at a rotational position where one edge of the stem 24 is substantially contacting rim 20 of lock ring 16, and with a certain rotational setting of cheek spanner 30 on stem 24, for example, the resulting orientation of said cheek spanner major dimension falls in the position shown by solid lines. However, if a relatively small degree of change of the cheek spanner rotation or twist (and therefore of a pulley wheel 36) with respect to surface S is desired, then such can be accomplished simply by changing the position of ball member 22 in its locking socket, and said FIG. 8 also shows by partial broken line the extent of change in orientation of the cheek spanner 30 accomplished solely by such adjustment. And, as will also be apparent, the change in angle of the major dimension of cheek spanner 30 with respect to surface S as shown at FIG. 8 is greater than the change in angle accomplished by shifting pins 50 to the adjacent pair of holes 48 from those initially selected, so that any order or rotational position of cheek spanner 30 and pulley wheel 36 is available.

As will also be evident, various other forms of incremenatl or continuous adjustment between cheek spanner 30 and stem 24 can be employed. By way of further example, incremental adjustment can be suitably accomplished by radial ribbing cast into the abutting surfaces of spanner 30 and raised portion 42. Also, in many installations, it will be found satisfactory to simply leave such abutting surfaces smooth, with the rotational position being locked simply by the pressure of engagement of lock nut 54, preferably with an associated friction washer of a suitable material such as rubber situated between the facing surface of spanner 30 and surface 46 of raised portion 42. Such simplified form of locking of the spanner on the stem is quite satisfactory for most installations in that pulley wheel 36 is normally operationally oriented and locked to receive line L without generating any great degree of rotational stress between spanner 30 and stem 24.

FIG. 3 presents a modified form of the invention which in its constructional form is identical with the form of the invention shown in FIGS. 1, 2 and 4, except that the angle of offset between the line or angle of connection 26' of the ball member 22' and the line or angle of inclination 28' is about 25°. With all other construction being identical, it will be apparent the form shown in FIGS. 1 and 2 can be converted to the form shown in FIG. 3, or vice versa, simply by substitution of one type of ball and stem component for the other.

The significance of the 65° angle of stem offset in the form of the invention shown in FIGS. 1 and 2, and the 25° angle of offset shown in the form of the invention shown in FIG. 3 is that with but the two angles of offset shown, the pulley assembly is rendered fully adjustable throughout a zone of adjustment occupying a full hemisphere above surface S. To illustrate this feature more specifically, FIGS. 6 and 7 show diagrammatic views of the respective zones of adjustment available from these two forms of the invention. In FIG. 6, and also noting the about 50° elevational angle of adjustment shown at FIG. 2 and one azimuthal setting of ball member 22, it will be seen that the zone of adjustment attributable to a 65° angle of stem offset is defined by revolving a 50° angle through a circle of revolution above the surface S, the lower extreme of such zone being substantially parallel to said surface. Similarly, as shown at FIG. 7, and also noting the angle of adjustment through an elevational angle of 50° in the form of the invention shown at FIG. 3, the zone of adjustment in this modification is defined by revolving a 50° angle with its apex at said ball member 22' through a circle of revolution about a line extending substantially vertically of the surface S, one side of such angle being coincident with said line. Compositely, it will be seen that the zone of adjustment shown at FIG. 6 and the zone of adjustment shown at FIG. 7 overlap and provide any azimuthal and elevational setting desired of the line of inclination 28 or 28' of the stem 24 or 24' (and therefore the pulley 36) with respect to the surface S.

As will also be apparent, any intermediate zone of adjustment defined by an elevational angle of about 50° and the circle of revolution thereof about a line substantially vertically of the surface S can be obtained by a corresponding angle of stem offset of a value intermediately of the 65° angle shown at FIG. 2 and the 25° angle shown at FIG. 3. This is an important design consideration in that certain usages of adjustable and lockable pulley assemblies need not reach extremes of adjustment either substantially horizontal to a base surface or substantially vertical to a base surface, but should nevertheless be widely flexible throughout a predetermined zone of settings intermediate such extremes. Simple appropriate modification of the design characteristic of the invention, merely by changing the angle of offset of the stem with respect to the ball member provides a single pulley assembly form having all necessary adjustability in such circumstances.

FIG. 5 discloses a further modified form of detailed construction having certain features characteristic of the invention. In this form, the angle of offset between the line or angle of connection of the stem 24" with ball member 22" and the line or angle of inclination of the pulley 36 is provided by connecting the outer end of said stem 24" to cheek spanner 30" at the desired offset angle, which is again shown at FIG. 5 as being about 25°, for example. As a further variation, the cheek spanner 30" in this instance is non-adjustably attached to said stem 24", as by weldment 56, it being also considered that provision for rotational adjustment as between stem 24" and cheek spanner 30" is not necessary in all instances, particularly for relatively small angles of stem offset, in that there is still sufficient adjustability available to orient the pulley wheel 36 into reasonable alignment with the line guided thereon. Also, it will be understood that the stems 24 or 24', in the forms of the invention shown at FIGS. 2 and 3, can be similarly welded or otherwise attached to cheek spanner 30, in the event the rotational adjustment feature is not necessary in a particular type of assembly. However, the form of the invention shown in FIG. 5 is not a preferred form for a pulley assembly of universal application, because of such lack of rotational adjustment between the stem and cheek spanner, and also because the design is most suitable only for relatively lighter loads on pulley 36, in that the line of pull exerted by tension on the line guided by the pulley 36 is not in substantial alignment with the center of ball member 22", and a heavy pull on pulley wheel 36 will tend to upset the locked position of ball member 22' in its socket.

From the foregoing, various further features, advantages, characteristics, modifications and applications of the present invention will be apparent to those skilled in the art, within the scope of the following claims.

What is claimed is:

1. A pulley assembly comprising means mounting a pulley wheel for free rotation including two spaced, parallel cheek members and a cheek spanner extending therebetween; a stem connected at one end to a mid-portion of said cheek spanner and connected at the other end to a ball member, with the center axis of said cheek spanner coincident with the center of juncture of said cheek spanner and stem deviating by a substantial angle of offset with respect to the radius of the ball coincident with the center of juncture of the ball and stem; a base plate including a generally planar bottom surface; and wide-mouthed socket means adjustably mounting and locking said ball member on said base plate and allowing adjustment of the attitude of said pulley wheel within a zone of adjustment extending 360° azimuthally and at least 50° elevationally with respect to the bottom surface of said base plate.

2. A pulley assembly comprising means mounting a pulley wheel for free rotation including two spaced, parallel cheek members and a cheek spanner extending therebetween; a stem connected at one end to a mid-portion of said cheek spanner and connected at the other end to a ball member, with the center axis of said cheek spanner coincident with the center of juncture of said cheek spanner and said stem deviating by an angle of offset of about 25° with respect to the radius of the ball coincident with the center of juncture of the ball and stem; a base plate including a generally planar bottom surface; and wide-mouthed socket means adjustably mounting and locking said ball member on said base plate and allowing adjustment of the pulley wheel within a zone of adjustment substantially defined by revolving a 50° angle with its apex at said ball member through a circle of revolution about a line extending substantially vertically of the bottom surface of said base plate, one side of said 50° angle being coincident with such vertical line.

3. A pulley assembly comprising means mounting a pulley wheel for free rotation including two spaced, parallel cheek members and a cheek spanner extending therebetween; a pair of stems selectively usable with said pulley wheel mounting means, each such stem having a first and a second end, with means on the first end for removably connecting the stem to a mid-portion of the cheek spanner and a ball member integrally joined to the second end, and with the center axis of the first end of said first stem deviating by an angle of offset of about 25° with respect to the radius of its ball member coincident with the center of juncture of such ball member and the second end of said first stem, and with the center axis of the first end of said second stem deviating by an angle of offset of about 65° with respect to the radius of its ball member coincident with the center of juncture of such ball member and the second end of said second stem; a base plate including a generally planar bottom surface; and wide-mouthed socket means removably and adjustably mounted and locking either the ball member of said first stem or the ball member of said second stem onto said base plate, and when the first stem is being used, such socket means allowing adjustment of the pulley wheel within a zone of adjustment substantially defined by revolving a 50° angle with its apex at said ball member through a circle of revolution about a line extending substantially vertically of the bottom surface of said base plate, one side of said 50° angle being coincident with such vertical line, and when the second stem is being used, such socket means allowing adjustment of the attitude of said pulley wheel within a zone of adjustment substantially defined by revolving an angle of about 50° through a circle of revolution above the bottom surface of said base plate, the lower extreme of such zone of adjustment being substantially parallel to the bottom surface of said base plate.

4. A pulley assembly attachable to a generally flat base surface and designed to be adjustable and lockable in any azimuthal and elevational attitude with respect to said base surface, such pulley assembly comprising a base plate including a generally planar bottom surface and half-socket means for receiving a ball member, a wide-mouthed locking ring removably mounted on said base plate and cooperating with said half-socket means to retain and lock a ball member therein, means mounting a pulley wheel for free rotation including parallel cheek members and a cheek spanner extending therebetween, and stem means removably connectible at one end thereof to said cheek spanner and having at the other end thereof a ball member removably retainable on said base plate by said locking ring; the said stem means comprising a plurality of interchangeable stems, each having at one end thereof means for mounting the cheek spanner and a ball member at the other end thereof for retention by said locking ring, the center axis of the stem end mounting the cheek spanner deviating by an acute angle of offset with respect to the radius of the ball member coincident with the center juncture of such ball member and the other end of said stem, the said angles of offset of the said stems being respectively different to a degree enabling the pulley wheel to be positioned at any desired elevational position with respect to the bottom surface of said base plate by appropriate selection and installation in the assembly of one of the plurality of stems.

5. A pulley assembly comprising means mounting a pulley wheel for free rotation including two spaced, parallel cheek members and a cheek spanner extending therebetween; a stem connected at one end to a mid-portion of said cheek spanner and connected at the other end to a ball member, with the center axis of said cheek spanner coincident with the center of juncture of said cheek spanner and stem deviating by a substantial angle of offset with respect to the radius of the ball coincident with the center of juncture of the ball and stem; a base plate including a generally planar bottom surface; wide-mouthed socket means adjustably mounting and locking said ball member on said base plate and allowing adjustment of the attitude of said pulley wheel within a zone of adjustment extending 360° azimuthally and at least 50° elevationally with respect to the bottom surface of said base plate, and means between said cheek spanner and said stem for rotatably adjustably affixing the axis of rotation of said pulley wheel with respect to said stem.

6. A pulley assembly according to claim 5, wherein the adjustment means between said cheek spanner and said stem includes separable interfitting raised and recessed elements.

7. An adjustable and lockable pulley assembly comprising a base member; a half-socket centrally disposed in said base member; a large-opening locking ring bolted to said base plate over said half-socket centrally disposed therein, said large-opening locking ring including means forming a second half-socket disposed toward said first half-socket; a ball member nested in between said half-sockets; a stem junctured with and extending at an acute angle of about 25°–65° with respect to the radius of said ball member at the center of the stem-ball juncture; a cheek spanner mounted at the other end of said stem; parallel cheek members extending from said cheek spanner; means journalling a pulley for free rotation between said cheek members; and means rotatably adjustably affixing said cheek spanner with respect to said stem.

References Cited in the file of this patent

UNITED STATES PATENTS

| | | |
|---|---|---|
| 306,952 | Porritt | Oct. 21, 1884 |
| 495,749 | Muron | Apr. 18, 1893 |
| 2,057,566 | Ellis et al. | Oct. 13, 1936 |